United States Patent [19]
Feuerstein et al.

[11] 3,917,432
[45] Nov. 4, 1975

[54] BORESCOPE SUPPORT APPARATUS

[75] Inventors: Roger F. Feuerstein, Schenectady; Maurice A. Freeman, Burnt Hills; Leonardo B. Spinelli, Albany, all of N.Y.

[73] Assignee: General Electric Company, Schenectady, N.Y.

[22] Filed: Nov. 13, 1974

[21] Appl. No.: 523,431

[52] U.S. Cl............... 415/118; 415/121 R; 356/241
[51] Int. Cl.² ........................................ F01D 25/29
[58] Field of Search ............ 415/121, 118; 356/241, 356/237

[56] References Cited
UNITED STATES PATENTS

| | | | |
|---|---|---|---|
| 3,297,022 | 1/1967 | Wallace | 356/241 |
| 3,690,775 | 9/1972 | Cousins | 356/241 |
| 3,849,893 | 11/1974 | Ormsby | 415/118 |

*Primary Examiner*—Henry F. Raduazo
*Attorney, Agent, or Firm*—Erwin F. Berrier, Jr.

[57] ABSTRACT

An apparatus for supporting a borescope probe in a gas turbine includes a housing, spaced swivel or washer bearings which receive the stem of the borescope probe, resilient washers disposed between the bearings that receive the borescope stem in close fitting relationship therewith, and a locking collar to selectively urge the bearings toward each other so as to deform the washers into gripping engagement with the borescope stem and frictionally lock the bearings.

3 Claims, 3 Drawing Figures

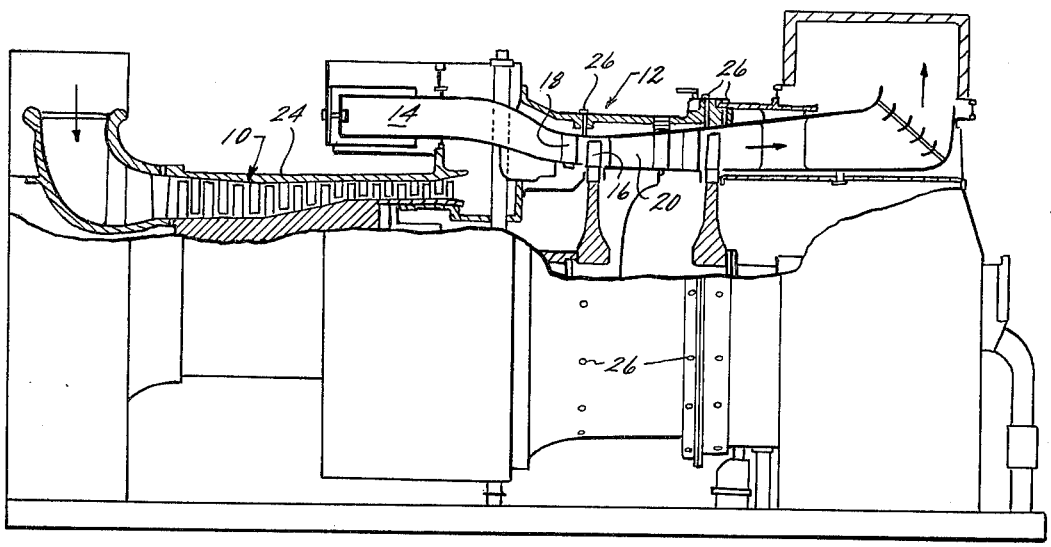
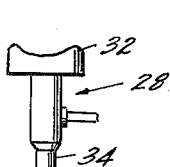
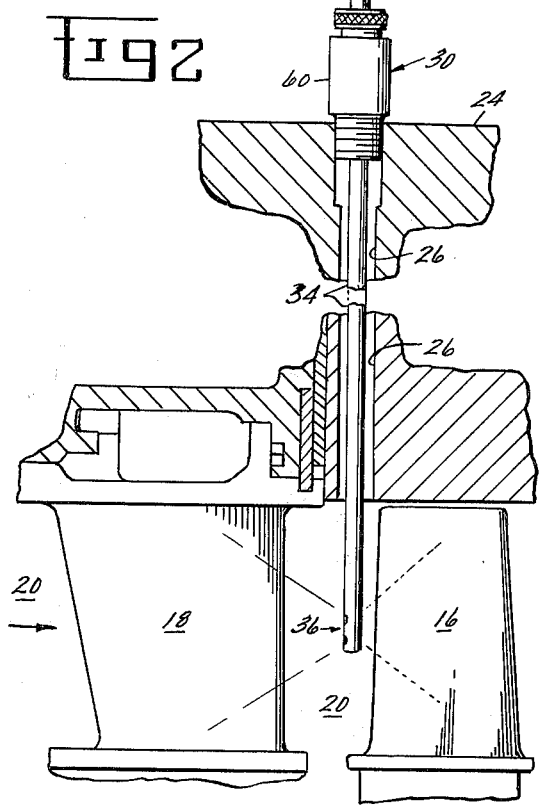
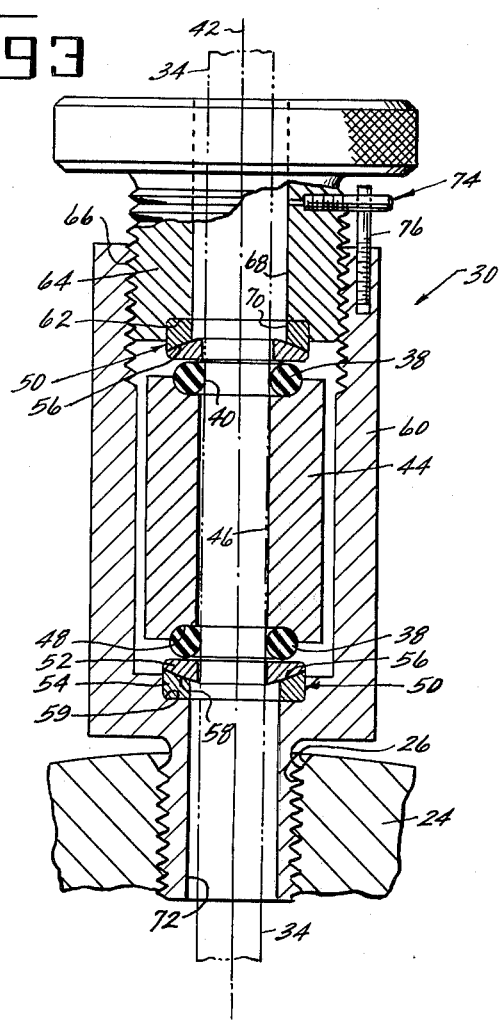

BORESCOPE SUPPORT APPARATUS

This invention relates to gas turbine engines and more particularly to apparatus for supporting a borescope inspection probe in a gas turbine engine.

BACKGROUND OF THE INVENTION

In recent years it has become quite common to inspect gas turbine engines using what is commonly referred to as a borescope. The borescope is inserted through access ports in the casing or casings of the gas turbine to permit viewing portions of the engine, such as compressor or turbine blades, that might otherwise require considerable disassembly to enable viewing.

Where the casing access ports are on the lower half of the gas turbine or where photography or a television camera is to be employed, it is desirable and may be necessary to provide a fixture to rigidly support the borescope and associated camera. A fixture for use with a flexible, fiber optics borescope is shown in U.S. Pat. No. 3,778,170, issued Dec. 11, 1973 and assigned to the assignee of the present invention. Such a fixture, however, is not suitable for use with a rigid optics borescope which has an inflexible shaft.

It is also desirable that the apparatus employed to support the borescope probe be such as to permit the operator to easily manipulate the borescope or change its viewing position so as to maximize the area that can be viewed through a single access port.

Accordingly, it is a primary object of this invention to provide a fixture that will rigidly support a borescope in a gas turbine engine and that permits the operator to readily move the borescope to and lock the borescope in the desired viewing position.

It is a further object of this invention to provide a compact adjustable borescope mounting device of rugged construction that permits the operator to readily adjust the radial insertion depth and rotational and angular position of the probe and lock the probe in the desired viewing position.

SUMMARY OF THE INVENTION

Briefly stated, the present invention provides a borescope support apparatus that includes at least one resiliently deformable washer which is disposed in a housing between spherical bearing means which are adapted to permit the washer to be swivelled. The resilient washer and bearing are formed with a central opening therethrough to permit passage of the borescope stem. The opening in the resilient washer is sized, in its nondeformed condition to slideably receive the stem portion of the borescope in close fitting relationship therewith. A locking collar is carried by the housing and is movable, as by threaded engagement with the housing, between a first position wherein the bearings are free to swivel and the borescope stem portion is free to slide in the washer and a second position wherein the bearings are locked against swivelling and the washer grips the borescope stem.

Each bearing preferably comprises an outer washer-like portion formed with a concave spherical surface about its central opening and an inner washer-like portion formed with a convex spherical surface about its central opening which is sized to seat on its associated concave surface.

In the preferred form, two axially spaced apart resilient washers are employed, the locking collar is threadably engaged with the housing and the outer portion of one bearing is secured to the locking collar while the outer portion of the other bearing is secured to the housing. The locking collar and housing are also formed with a central passage which is aligned with the central opening of the bearings and resilient washers to permit free insertion of the borescope probe.

BRIEF DESCRIPTION OF THE DRAWINGS

The present invention as well as the objects and advantages thereof will become apparent upon reading the following description of the preferred embodiment in conjunction with the drawings, wherein:

FIG. 1 is a side elevational view, diagrammatically showing an exemplary heavy duty gas turbine in partial cross-section;

FIG. 2 is an enlarged, fragmentary, cross-sectional view showing a portion of the turbine of FIG. 1.

FIG. 3 is an enlarged cross-sectional view showing the borescope support apparatus of this invention.

DETAILED DESCRIPTION OF THE INVENTION

With reference now to FIG. 1, an exemplary heavy duty gas turbine engine has been shown as including a compressor 10, a turbine 12, and a combustor 14. The combustor is adapted to receive fuel and a flow of pressurized air from the compressor and generate a hot gas stream. The hot gas stream is directed and provides motive power to the turbine 12 which, in turn, drives the compressor 10. The turbine 12 includes one or more stages of blades 16 and vanes 18 which extend radially across a hot gas stream flow annulas 20. A casing 24 extends around and encloses the compressor 10 and turbine 12. The casing 24 may conveniently be formed in two or more, suitably joined, semi-circular sections.

The casing 24 is formed with one or more access ports 26 to permit periodic inspection of components of the gas turbine disposed internally of the casing using a borescope probe. As will be understood, during operation of the gas turbine each of the ports 26 is closed by a suitable plug. While such a plug does not form a part of the present invention and, therefore, has not been depicted, an exemplary plug is shown in U.S. Pat. No. 3,362,160, issued Jan. 9, 1968 and assigned to the assignee of the present invention.

With reference now to FIG. 2, a borescope probe 28 has been shown extending through an access port 26 of the gas turbine casing 24 and is secured in position by the support apparatus 30 of this invention. The borescope 28 includes an eyepiece 32 and a generally cylindrical, elongated stem portion 34 which terminates in a distal viewing end 36. The borescope 28 carries a suitable lens system or optical train to transmit the image viewed at the distal end 36 along the stem portion 34 to the eyepiece 32. The borescope also includes lighting means at its distal end to illuminate the area to be viewed. Such means may, for example, comprise an external light source and a flexible fiberoptics bundle to transmit the light from the source to the distal end 36 of the borescope 28. While the borescope has been shown as being of the rigid optics type, the support apparatus 30 of this invention may be used with other types of borescope probes such as, for example, a flexible fiberoptics borescope.

With reference now to FIG. 3, the support apparatus 30 of this invention has been shown as including annular washers 38 or "O" rings which are formed of a suitable resiliently deformable material and include a central opening 40. The central opening 40 is sized to slideably receive the borescope stem portion 34 in close fitting relationship therewith. The resilient washers 38 are spaced apart along the axis 42 of the borescope shaft portion 34 by a suitable spacer 44 formed with a central passage 46 to permit passage of the borescope shaft 34 therethrough. The spacer is preferably formed with a suitable seat 48 at each end to receive the resilient washer 38 with at least a portion of the washer extending beyond the end of the spacer.

Spherical bearing means 50 abut each spherical washer, axially outwardly of the spacer 44, to provide for rotational or swivelling movement of the resilient washers 38, spacer 44, and the borescope shaft portion 34 about a point intermediate the bearings 50. The spherical bearings means 50 has been shown as comprising an inner washer-like portion 52 and an outer washer-like portion 54. The outer portions 54 are formed with axially facing concave spherical surfaces 56 which are arranged so as to face each other. Each inner portion 52 is formed with a convex spherical surface 58 which matches and seats on the concave surface 56 of its respective outer bearing portion 54.

The outer portion 54 of one bearing is seated with a seat 59 formed in a housing 60 and may be secured thereto by any convenient means such as by staking. The outer portion 54 of the other bearing is positioned with a suitable seat 62 which is formed in a locking collar 64 and may be suitably secured thereto as by staking.

The locking collar 64 is threadably engaged with the housing 60 as at 66. The locking collar 64, outer bearing portions 54 and housing 60 are formed, respectively, with central openings 68, 70 and 72 along the borescope axis 42 which are sized to receive the borescope stem portion 34 and to permit the desired amount of rotational movement of the borescope.

While the preferred embodiment of the support apparatus of this invention has been described and depicted as including two resilient washers 38 which are axially spaced apart by spacer 44, it should be understood that this construction may be varied. For example, the spacer could be eliminated or more than one spacer could be employed, and the spacers could be disposed between the resilient washer 38 and the bearings 50. The number of resilient washers employed may also be varied. In simplest form, a single washer with no spacer may be employed between the bearings 50. Whatever arrangement of resilient washers 38 and spacers 44 between the bearings 50, it will be understood that the radius of curvature of the concave and convex bearing surfaces 56 and 58 must be ajusted, relative to the spacing between the bearings 50, so that each inner bearing portion is free to slideably rotate on its concave seat.

In operation, the borescope stem portion 34 is inserted in the support apparatus 30 as shown in FIG. 3, with the locking collar 64 located in a first position where it is not exerting a deforming force on the resilient washers 38. With the locking collar so positioned, the borescope stem portion can be freely moved in and out along its axis 42 and rotated about its axis 42. Moreover, each inner bearing portion 52 is free to slideably rotate in the convex seat provided by its respective outer bearing portion 54 so that the borescope stem portion 34 may be rotated, tilted or swivelled about a point intermediate the bearings 50 to permit the borescope operator to scan or view a wide area within the gas turbine. When the borescope has been located in its desired viewing position, the operator may readily secure it by rotating the locking collar 64 into a second position where it is threaded deeper into the housing 60 and resiliently deforms the resilient washers or "O" rings 38 into gripping engagement with the borescope stem portion 34. Since the deforming force is applied to the resilient washers 38 through the bearings 50, frictional forces are developed between each inner and outer bearing portion which prevent further bearing movement and, hence, further rotation or swivelling of the borescope probe.

Since one revolution of the locking collar 64 is usually adequate to lock and un-lock the borescope, suitable stop means 74, such as pins 76, may be provided to prevent diassembly of the collar 64 from the housing and to prevent over tightening of the locking collar 64.

From the foregoing, it will be appreciated that the present invention provides a compact borescope mounting device of rugged construction that permits an operator to readily position the borescope probe or manipulate the probe so as to maximize the area that can be viewed and, at the same time, enables the operator to rigidly lock the probe in any desired position.

What is claimed is:

1. A gas turbine engine including a compressor, a turbine and a casing structure extending around said compressor and turbine, an access port formed through said casing structure, a borescope probe having an elongated stem portion projecting through said access port, and means for supporting said borescope probe, said means comprising:

a housing having a central opening sized to receive said borescope stem portion said housing adapted to be secured to said gas turbine casing with said central opening in general axial alignment with said casing access port;

a pair of spherical bearings, each said bearing having a first portion and a second portion, each said first portion formed with a concave surface and each said second portion formed with a convex surface adapted to seat on the concave surface of its respective first portion, a central opening formed through said spherical bearings and sized to receive said borescope stem portion, said bearings disposed in said housing with said concave surfaces facing each other and said bearing central openings in general axial alignment with said housing central opening;

at least one resilient deformable washer disposed between said spherical bearings and formed with an annular opening therethrough which is generally axially aligned with said bearing central openings and is sized, in a nondeformed condition, to slideably receive said borescope stem portion in close fitting relationship therewith;

a locking collar threadably engaged in said housing and formed with a central opening therethrough which is sized to receive said borescope stem portion and is generally axially aligned with said housing central opening;

the outer portion of one said bearing secured to said housing and the outer portion of the other said bearing secured to said locking collar, whereby when said locking collar is in a loose position, said borescope stem portion may be freely moved along and rotated about its axis and swivelled about a point intermediate said bearings and means when said locking collar is rotated in a direction of deeper threaded engagement with said housing, said resilient washer is deformed by said bearings into gripping engagement with said borescope stem portion and said bearings become frictionally locked.

2. The structure of claim 1 further characterized in that said apparatus includes two resilient washers and a spacer disposed between said washers.

3. The structure of claim 1 further characterized in that said apparatus includes stop means to prevent said locking collar from being threadably disengaged from said housing and overtightening of said locking collar.

* * * * *